(No Model.)   2 Sheets—Sheet 1.

A. D. GERBIG.
RATCHET FOR CAR BRAKE STAFFS.

No. 517,405.  Patented Mar. 27, 1894.

Witnesses
Jos. Froehlich
A. Mc. Howard

Inventor
August D. Gerbig
By Higdon & Higdon & Longan, Attys.

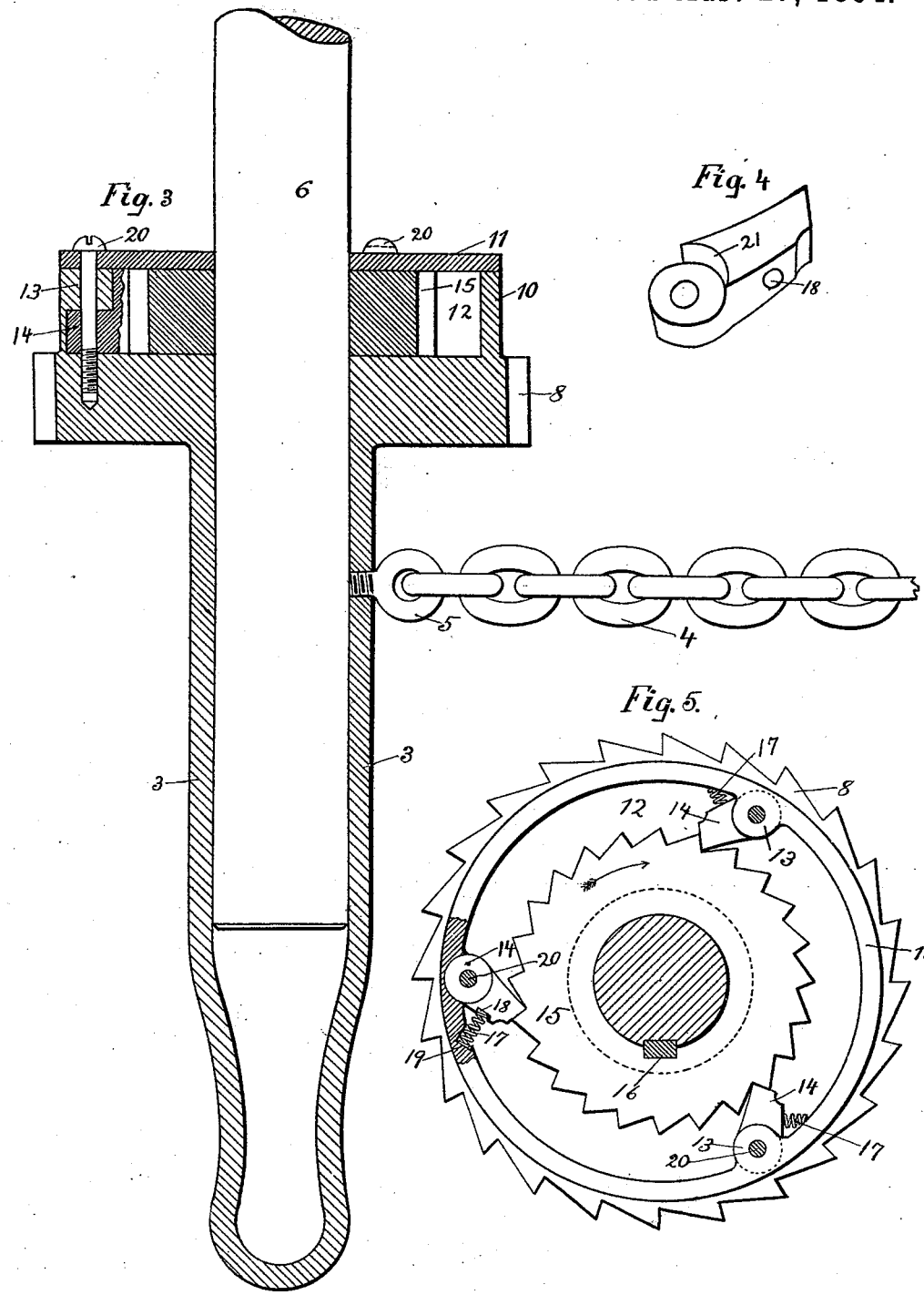

UNITED STATES PATENT OFFICE.

AUGUST D. GERBIG, OF ST. LOUIS, MISSOURI, ASSIGNOR TO THE LACLEDE CAR COMPANY, OF SAME PLACE.

RATCHET FOR CAR-BRAKE STAFFS.

SPECIFICATION forming part of Letters Patent No. 517,405, dated March 27, 1894.

Application filed October 23, 1893. Serial No. 488,883. (No model.)

*To all whom it may concern:*

Be it known that I, AUGUST D. GERBIG, of St. Louis, in the State of Missouri, have invented certain new and useful Improvements in Ratchets for Brake-Staffs, of which the following is a full, clear, and exact description, reference being had to the accompanying drawings, forming a part hereof.

My invention relates to an improved ratchet for brake staffs, and consists in the novel construction, combination and arrangement of parts hereinafter described, designated and illustrated in the accompanying drawings.

The object of my invention is to construct an improved device to be connected to a brake staff in such a manner that the hand-crank on said staff can be oscillated for setting the brake.

Figure 1:
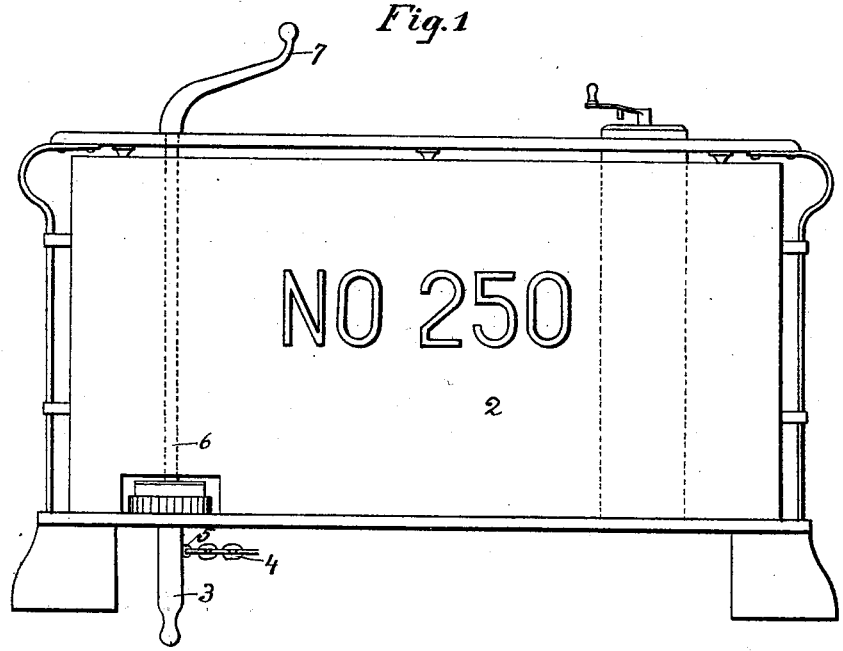
Figure 2:
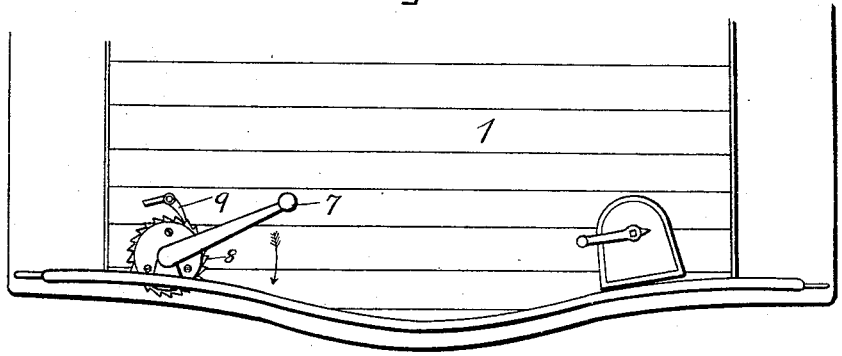

In the drawings: Figure 1 is a front elevation of a platform and dashboard of a street car of ordinary construction, showing my improved ratchet applied to the staff, which is mounted on said platform. Fig. 2 is a plan view of a portion of a street car platform, showing my invention applied thereto. Fig. 3 is an enlarged detail vertical central section of my improved ratchet. Fig. 4 is an enlarged detail perspective of one of the pawls which I use in carrying out my invention. Fig. 5 is an enlarged plan view of my improved device, the cover being removed to show the ratchet wheel and pawls, which I use in carrying out my invention.

Referring to the drawings: 1 indicates the platform of an ordinary street car, and 2 the dashboard, said dashboard being connected to the platform in the ordinary manner.

Located in a suitable opening formed in the platform adjacent the dashboard, is a sleeve 3 which extends downward a suitable distance below the under side of the platform, and a chain 4 is connected thereto by an eye 5 in such a manner that when the sleeve is rotated it will wind up the chain, the free end of the chain being connected to the brake of the car in the ordinary manner. Loosely mounted in this sleeve 3, and extending upward to the upper edge of the dashboard 2, is a staff 6 upon the upper end of which is mounted an ordinary hand-crank 7.

Formed integral with the upper end of the sleeve 3 is a ratchet wheel 8, which is engaged by a pawl 9 connected to the upper side of the platform 1 to hold said ratchet wheel in the required position when the brake is set.

Formed on or fixed to the upper side of the ratchet wheel 8 is an upwardly projecting annular rim 10 which is of suitable height that when the cover 11 is located thereon it will form a chamber 12 beneath said cover.

Formed on the inner side of the annular rim 10 is a suitable number of perforated ears 13, which extend outward from said rim and downward about half way the width of said rim, and the rim is cut away beneath each of said ears which forms a shoulder for the pawls 14, which are pivoted to said ears. These pawls are of suitable size that when so pivoted the free end will engage the ratchet wheel 15 which is mounted in the chamber 12, and rigidly connected to the staff 6 by a key 16. These pawls 14 are held in engagement with said ratchet wheel by a coil spring 17, one end of which is mounted in a depression 18 formed in the adjacent edge of the pawl, and the opposite end located in a depression 19 formed in the rim adjacent said pawl. (See Fig. 5 for illustration.) Each of the pawls is held in position by a screw 20 passing through the cover 11 and the perforated ears 13 and through the adjacent ends of the pawls, and is screwed into a suitable opening in the upper side of the ratchet wheel 8, thus holding said cover in position and the pawls with the same screws. A shoulder 21 is formed on each of the pawls, which engages and rests against the ears 13, thus taking the strain on said pawls from the screw 20 which holds said pawls in position. When the brake is released and it is desired to set the same, the operator who stands on the platform takes hold of the hand-crank 7 and oscillates said crank (the crank being in the position shown in Figs. 1 and 2) in the direction indicated by the arrow in Fig. 2. By so oscillating the crank it will rotate the sleeve 3, to which the chain is connected and wind said chain thereon, which operation will set the brake. It can be readily seen by inspecting Fig. 5 that by oscillating the crank handle, it will rotate the staff in but one direction. The pawl 9 engaging the ratchet wheel 8, in the manner hereinbefore stated, and said ratchet wheel being rigidly connected to the sleeve, upon which the chain is wound, prevents the sleeve from turning backward while the hand-crank is being moved backward. The ratchet wheel 15 being rigidly connected to the staff, as hereinbefore stated, when said staff is rotated in the direction indicated by the arrow in Figs. 2 and 5, it will rotate said ratchet wheel, and the pawls engaging said wheel will carry the ratchet wheel 8 which carries the sleeve which will wind the chain on said sleeve, thus setting the brake. When it is desirous of releasing the brake, the operator releases the pawl 9 from the ratchet wheel 8 and the staff 6, which will readily allow the sleeve 3 to turn backward, thus releasing the brake.

What I claim is—

1. A ratchet for a brake staff, comprising a ratchet wheel having a sleeve connected thereto, a staff mounted in said sleeve, and a ratchet wheel rigidly connected to said staff, and engaged by pawls connected to the upper side of the first mentioned ratchet wheel, substantially as set forth.

2. A ratchet for a brake staff, comprising a ratchet wheel having a sleeve rigidly connected thereto, a brake staff mounted in said sleeve, an annular rim formed on or fixed to the upper side of said ratchet wheel, and pawls connected to said rim to engage a ratchet wheel rigidly connected to the brake staff, substantially as set forth.

In testimony whereof I affix my signature in presence of two witnesses.

AUGUST D. GERBIG.

Witnesses:
W. J. SANKEY,
E. E. LONGAN.